Patented Dec. 4, 1945

2,390,198

UNITED STATES PATENT OFFICE 2,390,198

HARDENABLE RESIN COMPOSITION

Arthur Voss, deceased, late of Frankfort-on-the-Main, Germany, by Hedwig Voss, administratrix, Frankfort-on-the-Main, Germany, and Karl Dietz, Kronberg in Taunus, and Heinz Thomas, Hofheim in Taunus, Germany; vested in the Alien Property Custodian No Drawing. Application May 23, 1941, Serial No. 394,890. In Germany June 6, 1939

3 Claims. (Cl. 260—34)

The present invention relates to compositions of matter.

It is known that, owing to their mechanical strength and chemical resistance, the so-called phenol resins, i. e. condensates from phenols and formaldehyde, are dominating among the plastics known in the art though they belong to one of the oldest classes of plastics and, though they lack one important property, namely the elasticity characteristic of a series of new plastics, for instance, polymerization products.

Whereas the polymeric plastics possess an elasticity very similar to that owned by their natural prototypes, the cellulose and the caoutchouc, the plastics from phenol and formaldehyde show in their final state, i. e. in the case of hardenable resins in the state of resites, a comparatively small elasticity. Therefore, wherever this property is required in the industry said plastics can hardly be applied with success. In this domain, therefore, the phenol resins had to give way to the highly elastic plastics obtained by polymerization.

Since, however, the polymers do not live up to certain other properties of the phenol resins, the problem of preparing elastic phenol resins became more and more urgent; yet all attempts to arrive at a really satisfactory solution were without success. One of these attempts, repeated in vain, was the combination of phenol resins with softeners. Most of the softeners, however, had an insufficient compatibility with phenol resins and those which were sufficiently compatible and give rise to an improved elasticity were also not suitable since the improvement attained was again lost when the phenol resin was converted into its final state, i. e. the resite. The ingredients of the mixture demixed and the masses lost their uniformity and, consequently, their elastic properties.

Now, we have found that elasticity may be imparted to phenol resins by mixing them, if condensed not further than to the resol state and of being capable of hardening when heated or when mixed with known hardennig agents, with long-chained aliphatic organic compounds containing at least 12 carbon atoms and having in their molecule both an exchangeable, that is to say a reactive, halogen with a hydrophilic group of oxygen. Substances of this kind may belong to various classes of compounds; there are suitable, for instance, halogenhydrins, that is to say long-chained aliphatic compounds containing in their molecule bound to adjacent carbon atoms, on the one hand, an OH-group and, on the other hand, a halogen atom. Furthermore, there are very suitable, halogen containing polymerizates containing in the molecule besides the halogen atom a carboxylic acid group, the latter being present either as such or in the form of its anhydride. Such polymers are, for instance, interpolymers from vinylchloride and maleic anhydride, from vinylchloride and acrylic acid and from vinylchloride and methacrylic acid. Instead of vinylchloride, vinylchloracetate may be interpolymerized with the said monomeric acids. There may, furthermore, be used interpolymerizates from chloromaleic anhydride and vinyl compounds such as styrene or vinylacetate. In all these polymers the halogen is very reactive. Such interpolymerizates are, for instance, described in the Patent Specification of U. S. 2,047,398.

The above mentioned substances, which are all long-chained organic compounds and possess besides a very reactive halogen atom a hydrophilic group, may be incorporated with the phenol-aldehyde resins in various ways. It is possible to add the additional substances during the manufacture of the phenol-aldehyde resins or to admix them to the initially formed liquid condensates from phenol and aldehyde which are obtained in the usual manner by means of alkaline condensing agents and which still are in the resol state. It is also possible to use the said substances as additions to pulverulent masses from which moulded articles are to be prepared. Furthermore, the said substances may be added to known mixtures of phenol and aldehyde which harden in the cold or to liquid pre-condensates from phenol and aldehydes with simultaneous addition of the usual catalysts of hardening action, especially those of acid reaction, and/or adjuvants improving the chemical resistance. Catalysts of hardening action are described in U. S. Patent 2,034,802; for this purpose aromatic sulfochlorides are particularly useful. Adjuvants improving the chemical resistance of the said compositions of matter after hardening are, for instance, aliphatic esters of the formula $CH_2Cl.R$ where R represents a radical selected from the group consisting of —$CH_2Cl$; —$CH_2OH$;

—$CHOH.CH_2Cl$; —$CHCl.CH_2OH$ and

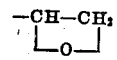

as described and claimed in patent application

Serial No. 241,016 filed November 17, 1938, in the name of Karl Dietz, Heinrich Greune and Franz Privinsky for "Masses capable of hardening rapidly in the cold and process of preparing them" and which is now U. S. Patent 2,258,546.

The above mentioned additional substances are distinguished from all hitherto known agents used for hardening in the cold or for improving the elasticity by the fact that they impart to the products considerably better elastic properties. These final products may be obtained in various forms, as masses for preparing shaped or moulded articles or, if desired with filling agents, as cement or mortar masses or as lacquers or the like.

The following examples serve to illustrate the invention but they are not intended to limit it thereto, the parts being by weight:

(1) 80 parts of a normal pulverulent phenol-formaldehyde-resin mass are mixed with 20 parts of an interpolymerisate from vinylchloride and maleic anhydride. This mixture may be used without any further treatment for the preparation of moulded articles of all kinds especially by way of hot-pressing. The elastic properties are essentially better than those of the articles obtained from normal phenol-resin masses, without the other known valuable properties of the phenoplasts being reduced.

(2) 90 parts of a liquid artificial resin obtained by condensation of phenol and formaldehyde are mixed with 10 parts of a chlorhydrin obtained from epichlorhydrin and dodecyl alcohol. The mixture may be hardened either by heat or by addition of a substance having a hardening action in the cold, for instance, an aromatic sulfochloride. An addition of softeners, for instance, benzyl alcohol, is also possible. These mixtures may be used either for lacquer-like paints or for impregnating building material and wood; furthermore, in admixture with filling agents, as mortar for building masonry, for painting and plastering or for preparing coatings, adhesives and filling-in masses.

Instead of the above mentioned chlorhydrin there may also be used the chlorhydrin obtained from epichlorhydrin and lauryl alcohol.

(3) 50 parts of a liquid condensation resin obtained from phenol and formaldehyde are mixed with 20 parts of an interpolymer from vinylchloride and maleic anhydride or of an interpolymer from chloromaleic anhydride and vinyl acetate as well as with 20 parts of 1.3-dichloropropanol and 10 parts of benzyl alcohol. 40 parts of this mixture are mixed with 10 parts of benzene sulfochloride whereupon the whole mass hardens by itself in the cold. Instead of benzene sulfochloride there may also be used paratoluene sulfochloride.

The mixtures thus obtained which harden in the cold may be used, with filling agents, for the preparation of mortars, cements and filling-in masses or, without filling agents, diluted with solvents for lacquers and impregnations.

We claim:

1. Compositions of matter comprising 80 parts of a heat hardenable phenol-formaldehyde condensation product condensed not further than the resol state and 20 parts of an interpolymerization product of vinyl chloride with maleic anhydride.

2. Compositions of matter comprising 80 parts of a heat-hardenable phenol-formaldehyde condensation product condensed not further than the resol state and 20 parts of an interpolymerization product of vinylchloride with maleic anhydride, an aliphatic ester of the formula $CH_2Cl.R$ where R represents a radical selected from the group consisting of —$CH_2Cl$; —$CH_2OH$;
—$CHOH.CH_2Cl$; —$CHCl.CH_2OH$ and

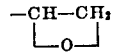

benzoyl alcohol and an aromatic sulfochloride.

3. A hardenable composition of matter comprising 80 parts of the heat hardenable condensation product of a phenol and an aldehyde in a state not further advanced than the resol state and 20 parts of a halogen containing interpolymerizate obtained by copolymerizing mixtures of materials selected from the group consisting of vinyl chloride and maleic anhydride; vinyl chloracetate and maleic anhydride; vinyl acetate and chloromaleic anhydride; styrene and chloromaleic anhydride.

HEDWIG VOSS,
As Administratrix of Arthur Voss, Deceased.
KARL DIETZ.
HEINZ THOMAS.

Certificate of Correction

December 4, 1945

Patent No. 2,390,198.

ARTHUR VOSS, DECEASED

It is hereby certified that error appears in the printed specification of the above numbered patent requiring correction as follows: Page 2, second column, line 35, for "benzoyl" read *benzyl*; and that the said Letters Patent should be read with this correction therein that the same may conform to the record of the case in the Patent Office.

Signed and sealed this 28th day of January, A. D. 1947.

[SEAL]

LESLIE FRAZER.
*First Assistant Commissioner of Patents.*